No. 891,669. PATENTED JUNE 23, 1908.
L. CARTER.
CORN HARVESTER ATTACHMENT.
APPLICATION FILED JUNE 24, 1907.

Inventor
L. Carter,

Witnesses

By
Attorneys

UNITED STATES PATENT OFFICE.

LEON CARTER, OF ASHERVILLE, KANSAS.

CORN-HARVESTER ATTACHMENT.

No. 891,669.  Specification of Letters Patent.  Patented June 23, 1908.

Application filed June 24, 1907. Serial No. 380,574.

*To all whom it may concern:*

Be it known that I, LEON CARTER, citizen of the United States, residing at Asherville, in the county of Mitchell and State of Kansas, have invented certain new and useful Improvements in Corn-Harvester Attachments, of which the following is a specification.

This invention provides a novel device for use in connection with the binder shaft of a corn harvester to effect discharge of the bundle after being bound and also to support the tops of the stalks during the formation of the bundle.

For a full understanding of the invention and the merits thereof and also to acquire a knowledge of the details of construction and the means for effecting the result, reference is to be had to the following description and accompanying drawings.

Figure 1:
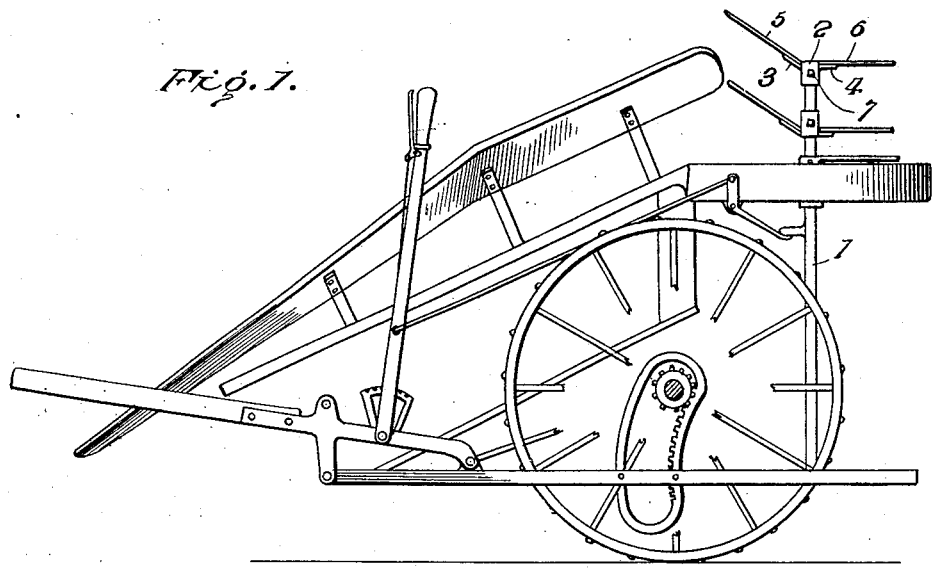
Figure 2:
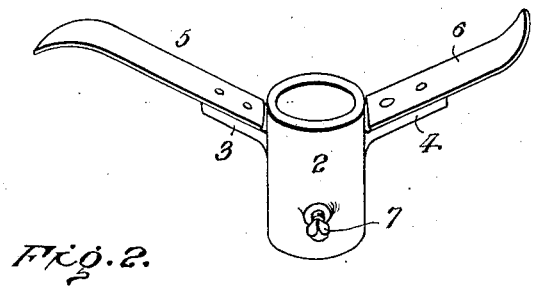

While the invention may be adapted to different forms and conditions by changes in the structure and minor details without departing from the spirit or essential features thereof, still the preferred embodiment is shown in the accompanying drawings, in which:

Figure 1 is a side view of a corn harvester provided with an attachment embodying the invention. Fig. 2 is a detail perspective view of the attachment.

Corresponding and like parts are referred to in the following description and indicated in all the views of the drawings by the same reference characters.

The corn harvester illustrated in Fig. 1 is of ordinary construction and is shown to demonstrate the application of the invention, the latter being fitted to the binder shaft 1. The attachment consists of a sleeve 2 having lugs 3 and 4 projected therefrom and arranged at opposite points and at one end of the sleeve. The lugs 3 and 4 are integral with the sleeve 2 and are flanged at their longitudinal edges to embrace opposite edges of the respective arms 5 and 6 which are fitted to the lugs 3 and 4 and bolted or otherwise fastened thereto. The lugs 3 and 4 project at an inclination which may be determined according to the style of harvester for which the attachment is designed. The arms 5 and 6 are tapered towards their ends and curved. The arm 6 is adapted to discharge the bundles after being bound, whereas the arm 5 is designed to engage with and hold the tops of the stalks while being formed into bundles. The provision of the two arms insures the arm 6 always being in proper position to effect discharge of the bundle at the proper instant, which is very essential when binding tall corn or when the wind is blowing.

The binder shaft of the harvester may be provided with one or more attachments according to the height of the corn being harvested, as shown in Fig. 1, and two attachments are secured to the binder shaft, the one above the other, thereby adapting the same for corn of varying height. The attachments are inverted, that is, the arms 5 and 6 are arranged at the upper end of the sleeve 2 of the top attachment and the arms of the lower attachment are located at the lower end of the sleeve. Suitable means may be provided for fastening the attachment to the binder shaft, such for instance as a set screw 7 which is threaded into an opening formed in a side of the sleeve. In arranging the attachment it is set with the arms square across the opening to which the bundle is discharged and slightly forward of the trip, thereby admitting of a well compressed bundle being formed. The attachment is advantageous since it holds the tops of the fodder securely while being formed in the bundles and operating automatically with the binder is out of the way of the bundle when the latter is being discharged and is in position to hold the next bundle during the course of its formation.

Having thus described the invention, what is claimed as new is:

In a harvester of the character specified, the combination of an upright shaft, an arm projected from the said shaft at about a right angle to effect discharge of the bundle when bound, and a second arm projected from the said shaft at an upward inclination to engage with and hold the tops of the stalks while being formed into bundles.

In testimony whereof I affix my signature in presence of two witnesses.

LEON CARTER. [L. S.]

Witnesses:
 W. E. SHULL,
 JOHN A. CARTER.